E. G. WATROUS.
COMBINED SHUT-OFF AND CHECK VALVE.
APPLICATION FILED MAY 25, 1906.
1,010,547.
Patented Dec. 5, 1911.
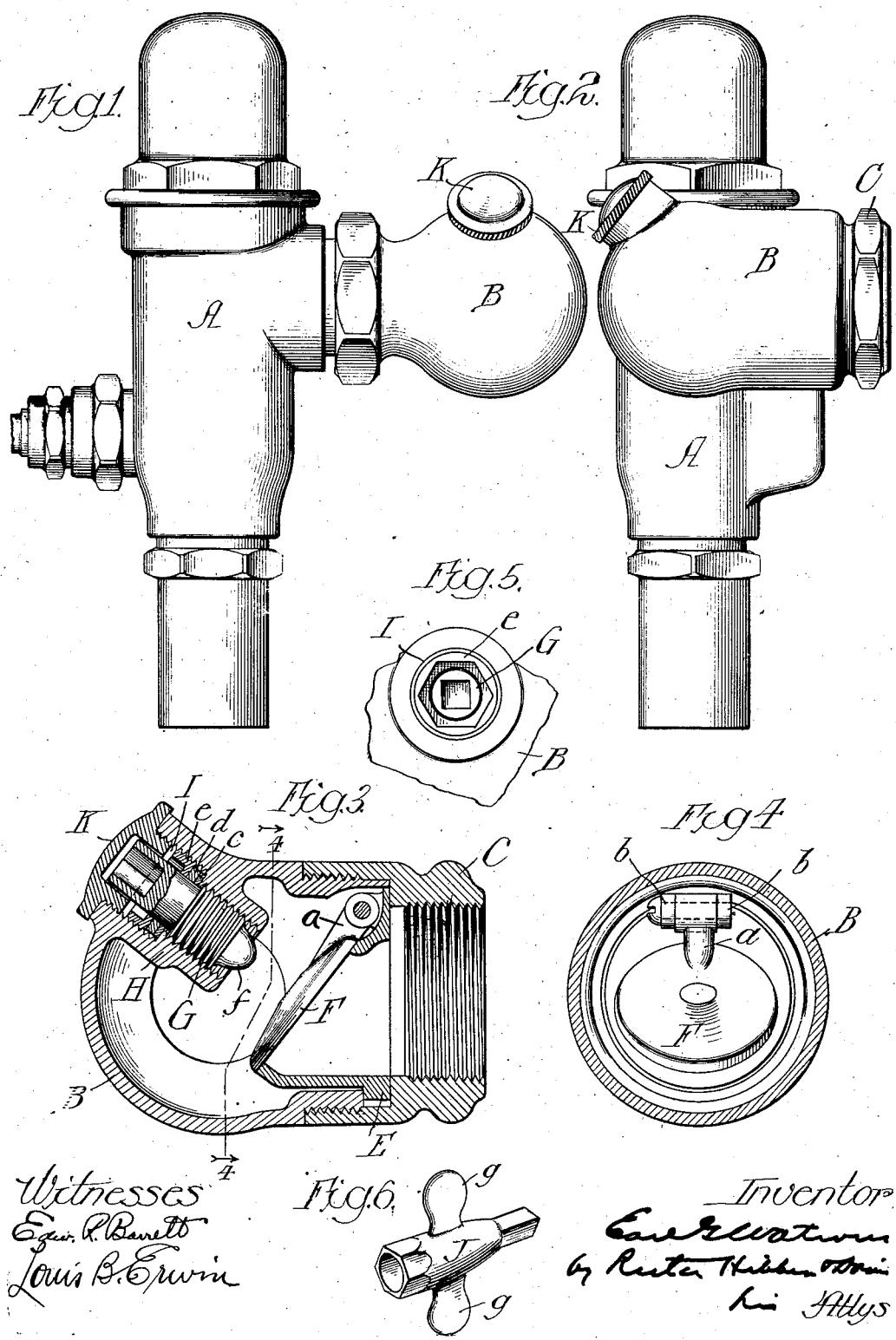

UNITED STATES PATENT OFFICE.

EARL G. WATROUS, OF CHICAGO, ILLINOIS.

COMBINED SHUT-OFF AND CHECK VALVE.

1,010,547. Specification of Letters Patent. Patented Dec. 5, 1911.

Application filed May 25, 1906. Serial No. 318,647.

*To all whom it may concern:*

Be it known that I, EARL G. WATROUS, a citizen of the United States, residing at Chicago, in the county of Cook and State of Illinois, have invented a certain new and useful Combined Shut-Off and Check Valve, of which the following is a description, reference being had to the accompanying drawings, forming part of this specification.

My new valve is designed more particularly for use in connection with water closet valves, such as that heretofore patented to me in Letters Patent No. 710,128, dated September 30, 1902, and now in extensive use. Such valves are frequently connected, on the different floors of a building, with a stand pipe or water supply pipe extending from the basement to the roof of the building and supplied with water from a tank upon the roof, the lavatories and other fixtures upon the different floors of the building being also connected with and supplied by the same pipe. It sometimes happens that the water supply in the tank will be allowed to become exhausted, so that all of the water in the stand pipe will eventually be drained off and the pipe left empty; and in such case it is desirable that communication between the pipe and the water closet valves upon the different floors shall be cut off, to prevent the passage of odors into the pipe and their escape through the various fixtures connected to it. My new combined shut-off and check valve is designed to accomplish this purpose automatically, and at the same time to provide for the permanent shutting off by hand of communication between the water closet valves and the supply pipe whenever desired.

In the accompanying drawings, Figure 1 represents a front view of a water closet valve, such as my aforesaid valve, connected to the supply pipe by means of the structure embodying my new shut-off and check valve; Fig. 2 is a side elevation of the same; Fig. 3 a longitudinal vertical section of the shut-off and check valve structure; Fig. 4 a vertical cross-section of the same; Fig. 5 a detail of the front side of the same, showing the socket in the end of the screw-plug and in the screw ring; and Fig 6 the key for turning the plug and ring.

The same letters of reference are employed to indicate corresponding parts in the several views.

In Fig. 1, A represents the water closet valve, having my new shut-off and check valve structure B coupled to the right side of it as shown. This shell B of my new valve has screwed upon its rear end a coupling or connecting member C, Figs. 2 and 3, by which it is connected to a nipple projecting from the vertical stand pipe or supply pipe within the wall and not shown in the drawing. Fitted within the rear end of the shell B and abutting against an annular shoulder therein, Fig. 3, is a ring or sleeve E, which projects forward into the shell B and has formed upon it an inclined seat for the check valve F, which latter consists of a flat disk hung by a lug *a* at its upper edge between suitable ears *b* formed upon the upper side of the ring E, Figs. 3 and 4. The gravity of the valve F causes it to normally rest upon its seat, while leaving it free to swing upward and forward under the pressure of water entering the rear end of the shell. The sleeve or ring E is held in place, against the annular shoulder in the shell B, by the abutting surface of an internal annular shoulder on the part C.

For the purpose of holding the valve F to its seat when desired, so as to shut off communication between the supply pipe and the valve F, I provide a screw-plug G and form a threaded bearing H for it in the upper forward part of the shell B. The inner half of the plug is enlarged and threaded to engage the bearing H, while its outer half is of reduced diameter, forming an annular shoulder at the junction of the two parts of the plug. The shell B is provided, in addition to the threaded bearing H for the plug G, with an outer enlarged threaded recess I, the bottom or inner end of which forms an annular shoulder. A washer *c* is fitted against this shoulder and a ring of packing material *d* placed upon the washer, and the two then clamped against the annular shoulder by a screw ring *e*, the opening through the washer, packing ring and screw ring being of sufficient diameter to permit the passage of the reduced outer portion of the screw plug G, but not sufficient to permit the passage of the enlarged threaded portion of the plug and the consequent withdrawal of the latter.

The screw-plug G is normally withdrawn to its outer limit of movement permitted by the washer *c*, as in Fig. 3, so that the check valve F is free to rise from its seat under the pressure of entering water; but whenever it is desired to permanently close the valve the plug G is screwed inward until the rounded nose $f$ upon its inner end bears against the center of the valve disk F and holds the latter firmly to its seat.

The screw-plug G is provided in its outer end with a square or other polygonal socket, Fig. 5, to receive the correspondingly shaped end of a key or turning-piece J, Fig. 6, the latter being in the present instance provided with wings $g$ by which it may be turned. The screw-ring $e$ which secures the packing ring $d$ and washer $c$ in place, is likewise provided with a polygonal shaped socket, shown in Fig. 5, and the larger end of the key J is externally shaped to fit said socket and is bored out to permit it to pass down over the projecting end of the screw-plug G when it is desired to insert it in the socket in the screw-ring for the purpose of screwing the latter into position in assembling the parts, or withdrawing it from position to insert a new packing ring. A cap K is screwed into the outer end of the threaded recess I to close the same.

As will be understood from the foregoing description, my new valve comprises a compact and efficient structure for connecting the water closet valve with the supply pipe, and for automatically cutting off communication between said valve and the supply pipe whenever the water supply in the latter is exhausted, and for also permanently cutting off such communication whenever it is desired to permanently disconnect the water closet and its valve from the supply pipe.

Having thus fully described my invention, I claim:

1. In a combined shut-off and check valve comprising a shell having inlet and outlet connections and a check valve for controlling communication between said connections normally resting by gravity upon its seat, means for holding the check valve permanently to its seat comprising a screw plug having a reduced cylindrical outer end adapted to be turned by a key and a threaded inner end, said inner end engaging a threaded bearing formed in said shell and adapted when screwed inward to bear against said valve and hold it to its seat, a packing ring surrounding said cylindrical outer end of the screw plug, and a screw ring adapted to be turned by a key screwing into a threaded recess in said shell and arranged to confine said packing ring in place; substantially as described.

2. In a combined shut-off and check valve comprising a shell having inlet and outlet connections, and a disk check valve for controlling communication between said connections normally resting by gravity upon its seat, means for holding the check valve permanently to its seat comprising a screw plug engaging a threaded bearing formed in the shell portion of the valve and adapted when screwed inward to bear at its inner end against the check valve and provided in its outer end with a socket for the reception of a key for turning it, a washer surrounding the outer reduced portion of said plug and seated against an annular shoulder formed in said shell, a packing ring resting upon said washer, and a screw ring screwed into a threaded recess in said shell and serving to clamp the packing ring and washer against the annular shoulder and provided in its outer face with a polygonal socket to receive a key for turning it; substantially as described.

EARL G. WATROUS.

Witnesses:
EDWARD RECTOR,
LOUIS B. ERWIN.